United States Patent
Geiger

[19]

[11] Patent Number: 5,814,269
[45] Date of Patent: Sep. 29, 1998

[54] PARISON TRANSPORTING DEVICE FOR BLOW MOLDING MACHINE

[75] Inventor: Albert Geiger, Garmisch-Partenkirchen, Germany

[73] Assignee: Verwaltungsgesellschsft Geiger Technik GmbH, Garmisch-Partenkirchen, Germany

[21] Appl. No.: 587,848

[22] Filed: Jan. 11, 1996

[30] Foreign Application Priority Data

Jan. 12, 1995 [DE] Germany .................. 195 00 696.8

[51] Int. Cl.$^6$ .................................................. B29C 49/04
[52] U.S. Cl. .................... 264/542; 425/532; 425/534
[58] Field of Search .................... 264/531, 540; 425/532, 534

[56] References Cited

U.S. PATENT DOCUMENTS

| | | | |
|---|---|---|---|
| 4,197,071 | 4/1980 | Salle et al. | 425/532 |
| 4,301,111 | 11/1981 | Olcott | 425/534 |
| 5,000,905 | 3/1991 | Cox et al. | 425/532 |

FOREIGN PATENT DOCUMENTS 53-010659  1/1978  Japan ....................... 264/540

*Primary Examiner*—Catherine Timm
*Attorney, Agent, or Firm*—Juettner Pyle Lloyd & Piontek

[57] ABSTRACT

A parison transporting device includes a conveyor system moveable either in longitudinal or transverse fashion relative to the direction of parison discharge in the tube receiving position below the tube forming head to receive, on the conveyor system, either a straight tubular piece or a tubular piece curved in accordance with the mold cavity of the blow mold. The conveyor system is then moved to the blow mold and into a position where an end section of the conveyor belt is positioned vertically above an end section of the mold cavity with the tubular piece located thereon. A rotating conveyor belt carried by the conveyor system is moved above the mold cavity either in both horizontal directions (X-direction and Y-direction) to arrange the straight tubular piece into the curved mold cavity, or, in the alternative, linearly above the mold cavity to drop the tubular piece, already positioned in curved fashion on the conveyor belt, into the correspondingly formed mold cavity.

22 Claims, 1 Drawing Sheet

PARISON TRANSPORTING DEVICE FOR BLOW MOLDING MACHINE

BACKGROUND OF THE INVENTION

The present invention relates to a parison transporting device for a blow molding machine for producing hollow plastic articles which are bent once or several times, for instance tubular pieces, comprising a tube forming head which discharges a heat-moldable tube, and a blowing station having a divided blow mold including a mold cavity in which the tube is blown up, the parison transporting device first receiving the tube and transporting the same to the blow mold, to which end the parison transporting device can be moved between the tube forming head and the blowing station.

When hollow plastic articles, such as tubular pieces which are bent once or several times, are produced, it is difficult to insert the tubular parison into the blow mold. Since the mold cavity of the blow mold which corresponds to the hollow plastic article to be produced has more than one axis, and since these axes are at angles with one another in space, i.e., the mold cavity may consist of a plurality of sections extending upwards and downwards towards both sides, the part of the blow mold that is either in a horizontal position or in an inclined position must be moved back and forth and also up and down accordingly while a tubular parison is being discharged in straight fashion, or these movements must be performed by the extruder when the mold is at a standstill. Since either the whole mold closing support including the blow mold or the extruder with the associated tube forming head must be moved in three axes perpendicular to one another, considerable weights must be moved, as both the mold closing supports and the extruders themselves weight several tons even in the case of small machines.

To avoid movement of one of the two heavy subassemblies extruder/tube forming head or mold closing support with blow mold, DE 43 05 735 C1 suggests a lightweight interim transporting mold which includes an upwardly open mold trough whose bottom can be opened. This interim transporting mold receives the tube exiting from the tube forming head and is then moved to the blowing station to transfer the tube to the blow mold. The interim transporting mold is of little weight, one of the reasons being that no closing forces have to act on it and no cooling channels have to be accommodated therein, so that it can be moved with considerable smaller efforts than one of the subassemblies extruder/tube forming head or mold closing support with blow mold.

The mold trough of the interim transporting mold according to DE 43 05 735 has the shape of the mold cavity of the blow mold. To receive the tube exiting from the tube forming head, the interim transporting mold is moved in its tube receiving position in both horizontal directions (X- and Y-axes) and is lifted or lowered in vertical direction until the whole tubular piece rests in the mold trough. The interim transporting mold is subsequently positioned above the lower part of the blow mold such that its mold trough lies vertically above the mold cavity of the blow mold, whereupon the bottom of the mold trough is opened, so that the parison drops into the mold cavity.

Use of such an interim transporting mold has turned out to be optimum in practice. However, which such a prior art solution for the problem of avoiding movement of large weights, an interim transporting mold corresponding to the associated mold cavity has to be made for each blow mold, since the mold trough thereof has to be adapted exactly to the shape of the mold cavity of the blow mold.

As far as the production of pipe bends is concerned, it is suggested in DE 30 38 590 C2 that the free end of a thermoplastic parison should be seized by a blow pin which is forcibly guided on an arm in such a manner that the blow pin inserts the parison into the mold cavity of the lower blow mold half.

SUMMARY OF THE INVENTION

It is the object of the present invention to provide a parison transporting device for a blow molding machine which can be used for blow molds having different mold cavities and to maintain the above-mentioned advantages at the same time.

It is another object of the present invention to provide a method for producing hollow plastic articles, which are bent once or several times, at low costs.

In accordance with the present invention, the parison transporting device comprises a conveyor belt means. This conveyor belt means includes a heat-resistant conveyor belt which is guided over deflection pulleys and driven by a drive means to rotate as an endless belt, the conveyor belt means being preferably secured to a frame or a support which can, for instance, be moved on the arm or the arms of a robot, or the like. The upper side of the conveyor belt extends preferably, but not necessarily, in a horizontal direction.

When a tube is being received, the conveyor belt means or assembly is moved in linear fashion below the tube forming head so as to receive a straight tubular piece on the conveyor belt. However, the conveyor belt means can also be moved in both axial directions (X-direction and Y-direction) when the tube is being received in order to receive a tubular piece which is already curved according to the mold cavity of the blow mold.

Furthermore, it is within the scope of the present invention that the conveyor belt means or assembly remains stationary while the tube is being received and the conveyor belt rotates for receiving a straight tubular piece.

Even if the conveyor belt means is moved below the tube forming head while the tube is being received, the conveyor belt can rotate so that the movement of the conveyor belt means and that of the conveyor belt overlap each other. The conveyor belt can rotate either at a continuous speed or, however, it may preferably be rotated discontinuously in case of a two-dimensional movement of the conveyor belt means below the tube forming head for receiving a bent tubular piece, thereby effecting a longitudinal compensation in the case of inclined paths of the mold cavity of the blow mold. This means that the conveyor belt means can be moved in two-dimensional fashion below the tube forming head such that the resultant movement corresponds to the projection of the mold cavity of the blow mold into the horizontal, and that the extension of the mold cavity in the vertical direction (Z-direction) can be taken into account in that the conveyor belt is rotated at a predetermined speed or speeds at predetermined times.

After the conveyor belt has received a straight tubular piece, the conveyor belt means is moved at least in a two-dimensional manner, i.e., in both horizontal directions (X-direction and Y-direction) for inserting the tubular piece into the mold cavity of the blow mold, so that the straight tubular piece is continuously inserted into the curved mold cavity. It is within the scope of the invention that the conveyor belt means can also be moved up and down to follow the height extension of the mold cavity.

The conveyor belt (or the conveyor belt means) is first positioned in the initial position such that the end of the tubular piece which hangs down at the end of the conveyor belt (depending on the running direction of the conveyor belt) is moved or inserted into the end (or beginning) of the mold cavity. The conveyor belt means subsequently follows, with the further rotating conveyor belt, the curvature of the mold cavity of the blow mold, so that the tubular piece which is continuously conveyed beyond the front end of the conveyor belt is continuously inserted into the mold cavity.

The running speed of the belt is here adapted to the course of the movement of the whole conveyor belt means, with the running speed of the belt preferably corresponding to the speed at which the conveyor belt means moved along the path of the mold cavity. If the path of the mold cavity is inclined, the belt speed should be correspondingly higher than the speed of the conveyor belt means.

To prevent the tubular piece from being displaced laterally on the conveyor belt when being inserted into the curved mold cavity, the tubular piece may be held in its position by lateral guides in the end section of the conveyor belt, i.e., near the area in which it leaves the conveyor belt. To this end, two lateral guide plates may, for instance, be secured to the support or frame of the conveyor belt means between which the tubular piece extends. Instead of guide plates, there may, for instance, be provided rolls.

It is suggested as an alternative or additional measure that the surface of the conveyor belt should be designed such that an increased friction or increased holding forces prevent an unintended lateral displacement of the tubular piece. The "non-skid quality" of the conveyor belt may, for instance, be increased by the surface of the conveyor belt being suitably corrugated, or burls or pointed projections which are densely distributed over the surface may, for instance, ensure that the tubular piece maintains the desired position on the conveyor belt.

When the conveyor belt means has been moved or displaced below the tube forming head in two-dimensional fashion to receive the tube exiting from the tube forming head in the mold cavity of a correspondingly curved shape on the conveyor belt, the conveyor belt means is just moved in linear fashion in the tube discharging position above the mold cavity of the blow mold, so that the suitably premolded tubular piece is placed continuously into the mold cavity when the conveyor belt rotates. The rotational speed of the conveyor belt is again adapted to the movement of the conveyor belt means. The running speed of the conveyor belt may be varied for the purpose of longitudinal compensation in the case of slopes of the mold cavity (curvature in vertical direction). The speed at which the conveyor belt means is moved over the mold cavity may also be varied alternatively or additionally.

The conveyor belt means which is provided as a parison transporting device can be used for blow molds having the most different mold cavities. Depending on the respective application, it may be expedient to perform the two-axial or two-dimensional movement of the conveyor belt means below the tube forming head or above the mold cavity, a three-axial movement being also possible in the last-mentioned case. A longitudinal compensation in the case of slopes of the mold cavity can be effected by varying the rotational speed or discharge speed of the convey or belt, so that the tubular piece located on the plane conveyor belt can exactly be arranged in the mold cavity.

BRIEF DESCRIPTION OF THE DRAWINGS

Further features of the invention follow from the following description of a preferred embodiment of a blow molding machine, wherein, in a purely diagrammatic manner.

DESCRIPTION OF THE PREFERRED EMBODIMENTS

Figure 1:
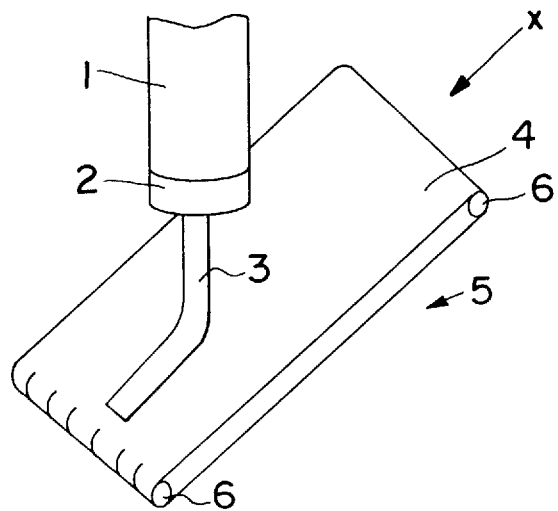
FIG. 1 is a perspective view of a conveyor belt means which is arranged below a tube forming head and is just receiving a tubular parison.

The figures show an embodiment of the invention in a purely diagrammatic manner. FIG. 1 shows a tube forming head 1 which is arranged downstream of an extruder and from whose nozzle, which is positioned in a nozzle ring 2, a heat-moldable tubular piece 3 is continuously extruded downwards.

Figure 2:
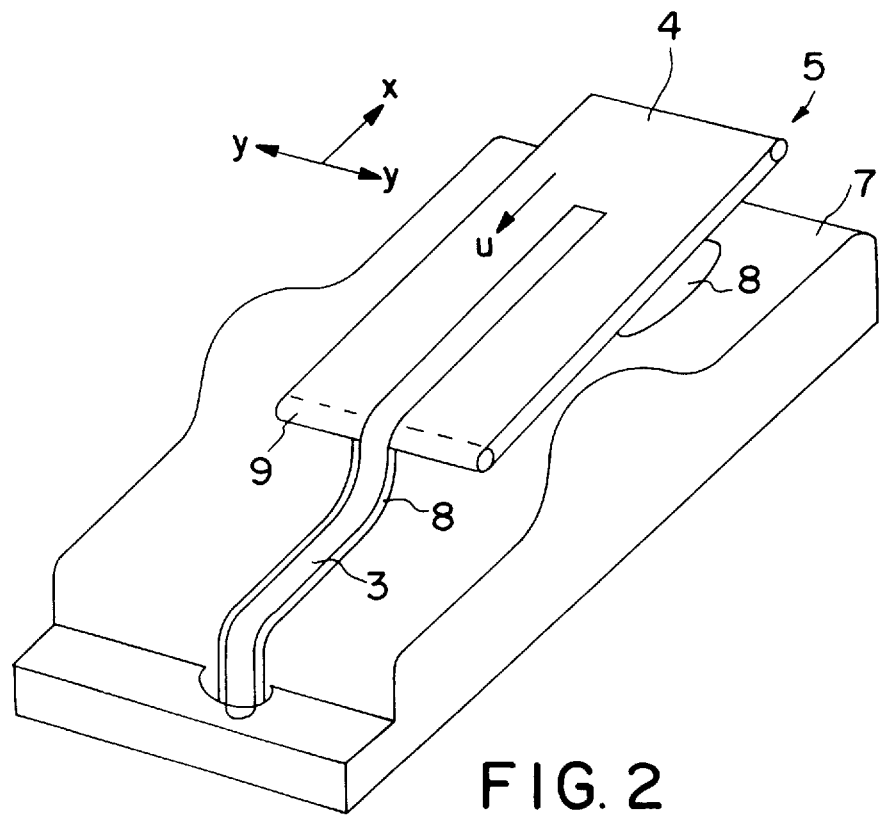
FIG. 2 is a perspective view of the conveyor belt means when a parison is being discharged into the mold cavity of a blow mold.

The tubular piece 3 is received by a conveyor belt 4 of a conveyor belt means 5 (only shown in part) which is moved in the direction of arrow X below and beyond the tube forming head 1. As regards the conveyor belt means 5, there are only outlined two deflection pulleys 6 around which the convey or belt 4 is guided. Furthermore, the conveyor belt means 5 includes a drive means (not shown) and a support (also not shown) which holds the components of the conveyor belt means and is guided, for instance, on a robot arm and can be moved back and forth on rolls or wheels (not shown) on rails (also not shown) with the aid of a simple motor of small dimensions, e.g., a simple servomotor, between the tube receiving positions and the blow mold shown in FIG. 2. A conveyor belt means 5 is, on the whole, relatively lightweight.

Although this is not shown in FIG. 1, the lower end of the tubular piece 3 is squeezed and thus closed in the customary manner between two clamping plates which can be displaced in horizontal direction. While the tube 3 is being received, the conveyor belt means 5 is moved in a straight line in the X-direction until the whole tubular piece is received. While the tubular piece 4 is being ejected from the nozzle ring 2 and placed on the conveyor belt 4, so-called support air is admitted into the tubular piece 3 through the nozzle of the tube forming head 1 for ensuring that the tubular piece 3 cannot collapse after its rear end has been squeezed by a further pair of clamping plates (which are also not shown). The tubular piece by squeezing the end of the tubular piece 3.

After the tubular piece 3 has been placed on the conveyor belt 4, the conveyor belt means 5 is moved on its support (not shown) either in X-direction or in a direction positioned laterally from the X-direction beyond the lower part 7 of a blow mold with mold cavity 8 to such an extent that the front section of the tubular piece 3 is vertically positioned above the front end section of the mold cavity 8. In this position, the conveyor belt 4 is rotated (arrow U in FIG. 2), whereby a small tubular section first passes beyond the front edge 9 of the conveyor belt 4 downwards into the mold cavity 8. The conveyor belt means 5 is then moved continuously in the X- and Y-directions, with the conveyor belt 4 continuing its rotational movement of course, in such a manner that successive longitudinal sections of the tubular piece 3 are inserted into the mold cavity. Depending on the respective shape of the mold cavity, the conveyor belt means 5 may also be moved in the Z-direction, and the rotational speed of the convey or belt may vary, just like the speed at which the conveyor belt means is moved as a whole, preferably in order to effect a longitudinal compensation for inclined paths of the mold cavity.

When the whole tubular piece 3 has been inserted into mold cavity, the conveyor belt means 5 is again moved to the tube forming head 1, whereupon the blow mold 7 is closed by means of an associated upper member. Subsequently, air is preferably introduced by a blowing needle (not shown) into the parison for pressing the parison against the wall of the mold cavity 8, whereby the desired hollow plastic article is formed.

It should be noted that the conveyor belt need not be formed by a one-part endless belt, but that it may also consist of individual belt members which are, for instance, interconnected by being articulated to one another.

What is claimed is:

1. A blow molding apparatus for producing hollow plastic articles having a plurality of longitudinal axes, said blow molding machine comprising a tube forming head for discharging a heat-moldable hollow parison in a direction of parison discharge and a blow station having a divided blow mold defining a mold cavity having a plurality of longitudinal axes, the parison transporting device comprising a conveyor system having a rotatable conveyor belt for receiving the parison and transporting the parison between said tube forming head and said blow molding station, the conveyor system positioning system for movement of the conveyor system for exact arrangement of the having control means for moving the conveyor belt so as to arrange the parison in a plurality of longitudinal axes conforming to the longitudinal axes of said blow mold cavity.

2. The device according to claim 1, wherein said conveyor system is movable in a linear or X-direction coincident with the direction of belt rotation when proximate the forming head to receive a straight hollow parison on the conveyor belt.

3. The device according to claim 1, wherein said conveyor system is moveable in two dimensions within an X-Y plane when proximate the forming head to position the parison as a curved tubular piece on said conveyor belt, wherein the X coordinate is substantially coincident with the direction of belt rotation and the Y coordinate is substantially transverse to the direction of belt rotation.

4. The device according to claim 1, wherein said conveyor system remains stationary while the parison is being received onto the conveyor belt.

5. The device according to claim 1, wherein said conveyor belt is rotatable while the parison is being received onto said belt.

6. The device according to claim 1, wherein said mold cavity is a curved mold cavity and said conveyor system is movable when proximate the blow station in a plurality of directions such that said parison, when transferred from the conveyor belt, is continuously placed into said curved mold cavity.

7. The device according to claim 1, wherein said conveyor system is simultaneously movable in both an X-direction substantially coincident with the direction of belt rotation and a Y-direction substantially transverse to the direction of belt rotation within an X-Y plane when proximate the forming head.

8. The device according to claim 1, wherein said conveyor system can be lifted and lowered when proximate the forming head.

9. The device according to claim 1, wherein said parison is positioned onto the conveyor belt as a curved tubular piece and said mold cavity comprises a corresponding curved mold cavity, said rotatable conveyor belt being linearly movable over the mold cavity in the direction of conveyor belt rotation when proximate and above the mold cavity of said blow mold, such that the curved tubular piece discharged from the conveyor belt during rotation is placed continuously into the corresponding curved mold cavity.

10. The device according to claim 1 wherein the rotational velocity of said conveyor belt can be varied as the parison is being discharged.

11. The device according to claim 1, wherein said conveyor system further comprises lateral guides which prevent the parison from being displaced laterally, relative to the direction of belt rotation, on said conveyor belt, said lateral guides being located at an end of said conveyor belt at which said parison is discharged into said mold cavity.

12. A method for producing a hollow plastic article having a plurality of longitudinal axes comprising the steps of:
    a) forming a heat-moldable tube from a tube forming head;
    b) moving a conveyor belt carried on a conveyor system below said tube forming head and depositing said tube onto said conveyor belt;
    c) moving said conveyor system into a position above a mold cavity of a blow mold such that an end section of said conveyor belt together with the tube located thereon is vertically positioned above an end section of said mold cavity;
    d) rotating said conveyor belt;
    e) moving said conveyor system simultaneously with rotation of the conveyor belt above said blow mold such that the tube has a plurality of longitudinal axes conforming to the longitudinal axes of said hollow plastic article as the tube drops continuously into the mold cavity of said blow mold; and
    f) moving the conveyor system out of the area of said blow mold, whereupon said blow mold is closed and said tube is pressed against a wall of said mold cavity by introduction of a blow medium to form said hollow plastic article having a plurality of longitudinal axes.

13. The invention of claim 1, wherein the conveyor system is positioned proximate the forming head and is moved in a linear or X-direction substantially coincident with the direction of belt rotation and at a linear velocity corresponding to the velocity of parison discharge from the forming head during parison discharge.

14. The invention of claim 1, wherein the conveyor system is positioned proximate the forming head and remains substantially stationary during parison discharge, the rotatable conveyer belt rotating during parison discharge.

15. The invention of claim 1, wherein the conveyor system is moveable in a linear or X-direction substantially coincident with the direction of belt rotation and a lateral or Y-direction substantially transverse to the direction of belt rotation.

16. The invention of claim 15, wherein the conveyor system is moveable in said linear direction and said lateral direction when located proximate the forming head during discharge of the parison.

17. The invention of claim 15, wherein the conveyor belt system is located proximate and above the blow station and is moved in said linear direction and said lateral direction when proximate the blow station during arrangement of the parison within the mold cavity.

18. The invention of claim 15, wherein the conveyor belt rotates during parison discharge, said conveyor belt rotating at an adjustable velocity relative the discharging parison.

19. The invention of claim 1, wherein the conveyor belt receives the parison from the forming head and is subsequently moved in a linear or X-direction substantially coincident with the direction of belt rotation from the forming head to the blow station for exact arrangement of the parison within the mold cavity.

20. A parison transporting device for a blow molding machine for producing a hollow plastic article having a plurality of longitudinal axes, said blow molding machine comprising a tube forming head for discharging a heat-moldable hollow parison and a blow station having a divided blow mold defining a mold cavity having a plurality of longitudinal axes, the parison transporting device comprising a conveyor system having a rotatable conveyor belt for receiving the parison from the tube forming head, transporting the parison between said tube forming head and said blowing station, and transferring the parison from the conveyor belt to the mold cavity, the conveyor system being movable in an X-Y plane, the X-coordinate being substantially coincident with the direction of belt rotation and the Y-coordinate being substantially transverse to the direction of belt rotation, said mold cavity having a sloped longitudinal axis and said conveyor system having a variable transfer speed mechanism for said conveyor belt for varying the conveyor belt speed when transferring the parison to the blow mold and for compensating for the sloped longitudinal axis of the mold cavity such that the parison conforms to the plurality of longitudinal axes of said mold cavity.

21. The device according to claim 20 wherein the rotational velocity of said conveyor belt is varied when the parison is being transferred.

22. The device according to claim 20 wherein the velocity of movement of said conveyor belt is in an X-direction coincident with the X-coordinate and is varied when the parison is being transferred.

\* \* \* \* \*